CRYOGENIC MEMORY

Filed July 8, 1964

3 Sheets-Sheet 1

Inventors:
John W. Bremer,
Vernon L. Newhouse,
by Richard R. Brainard
Their Attorney.

CRYOGENIC MEMORY

Inventors:
John W. Bremer,
Vernon L. Newhouse,
by Richard R. Brainard
Their Attorney.

Inventors:
John W. Bremer,
Vernon L. Newhouse,
by Richard R. Brainard
Their Attorney.

United States Patent Office 3,182,294
Patented May 4, 1965

3,182,294

CRYOGENIC MEMORY

John W. Bremer, Sunnyvale, Calif., and Vernon L. Newhouse, Scotia, N.Y., assignors to General Electric Company, a corporation of New York Filed July 8, 1964, Ser. No. 382,692
17 Claims. (Cl. 340—173.1)

Figure 1:
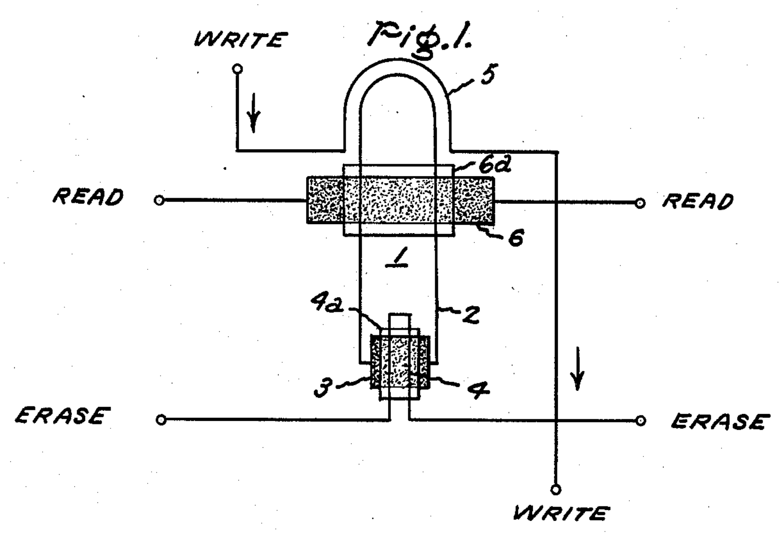

This invention relates to a cryogenic electronic memory and more particularly to such a memory having an improved organization contributing to a reduction in memory size and an increase in memory operating speed. This application is a continuation-in-part of our copending application Serial No. 47,539, filed August 4, 1960, now abandoned, and assigned to the assignee of the present application.

Certain electrical conductors are known to exhibit a loss of electrical resistance at temperatures approaching absolute zero and to regain this resistance in the presence of a specified magnetic field. A switching device employing this phenomenon includes a first such conductor with a conducting coil therearound, means being provided to maintain the device below the temperature at which resistance in the first conductor substantially disappears. A current passed through the coil of value sufficient to produce a certain "critical" magnetic field returns the first conductor to a resistive or normal state. Since the controlled conductor exhibits two distinctly different electrical states, i.e., the superconducting state and the resistive or normal state, it is employed advantageously as a computer logic element. Bistable circuits formed of such elements are capable of assuming and retaining selected current flow paths and therefore may form the basis of computer memory systems.

In conventional computing equipment the memory portion of the computer consumes a considerable portion of the space allotted to the computer. A reduction in computer size may be brought about by a reduction in the size of the memory and, in turn, by a reduction in the size of the memory's component elements. An advantageously compact component construction employed in accordance with the present invention is disclosed and claimed in our Patent No. 3,076,102, issued January 29, 1963. According to this construction, a cryogenic electronic switching element is formed from a first "gate" layer consisting of a flat metallic film, and a second insulated "control grid" film layer deposited thereacross. A current of predetermined magnitude flowing in the control grid establishes a magnetic field therearound capable of rendering the gate resistive. Current gain may be realized in such a device wherein the grid is narrow since its reduced cross-section increases the magnetic field intensity near the grid for a given current flowing therein. Switching devices of the above type may be greatly miniaturized and tightly packed without altering their operation. For example, a memory system may include twenty thousand such devices per square foot on a flat plate substrate. Substrates can then be stacked with more than two such plates per centimeter of height resulting in a capacity of over a million switching devices per cubic foot.

However, even with miniaturized switching devices, much valuable memory space is wasted when the devices are employed in conventional circuits. For example, prior cryogenic memory systems comprise a multiplicity of somewhat cumbersome bistable "flip-flops" based upon alternate current flow paths, and associated logic. Additional circuitry is required for writing into the bistable circuits and for retrieving the same information in a non-destructive manner. Such circuitry is not only space consuming but tends to be slow in its operation.

It is accordingly an object of this invention to provide an improved cryogenic electronic memory wherein an increased number of operations may be carried on in a given time and volume.

It is another object of this invention to provide an improved cryogenic electronic memory requiring simpler apparatus and circuitry for inserting and withdrawing information non-destructively.

It is another object of this invention to provide an improved cryogenic electronic memory requiring a minimum number of elemental units and having a maximum packing for the information stored.

It is another object of this invention to provide an improved "catalog" memory matrix wherein a large number of stored information units may be compared with an input interrogation unit.

In accordance with the invention, a basic memory unit employed is a loop circuit capable of superconduction deposited as a film upon an insulating substrate. The loop is provided with a coupling means for injecting a current into at least a portion of the loop, as well as an inhibiting grid lead across a portion of the loop for rendering normal at least a part thereof, and a superconducting output gate crossing the loop which gate may be rendered normal by currents flowing in the loop. This basic building block or cell is set forth and claimed in our copending application Serial No. 311,272, filed August 19, 1963. Application Serial No. 311,272 is a division of our aforementioned application Serial No. 47,539, and is also assigned to the assignee of the present invention. In accordance with a principal feature of the present invention a memory matrix of the catalog type includes columns and rows of the aforementioned individual cryogenic electronic memory loops or cells. Input conductors join or couple the said coupling means in each column of these cells while selection and output coupling means join the inhibiting grids and output gates in separate rows or word groups of cells. The memory matrix of the present invention effects the simultaneous comparison of an interrogation with the memory's contents for indicating a comparing word in the memory.

Figure 2:
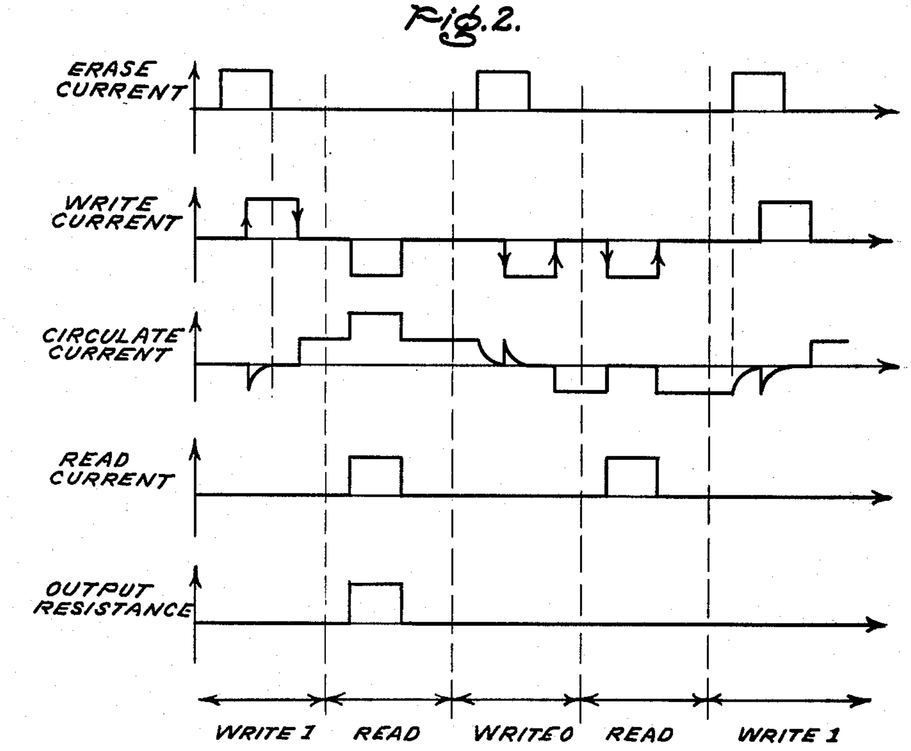
Figure 3:
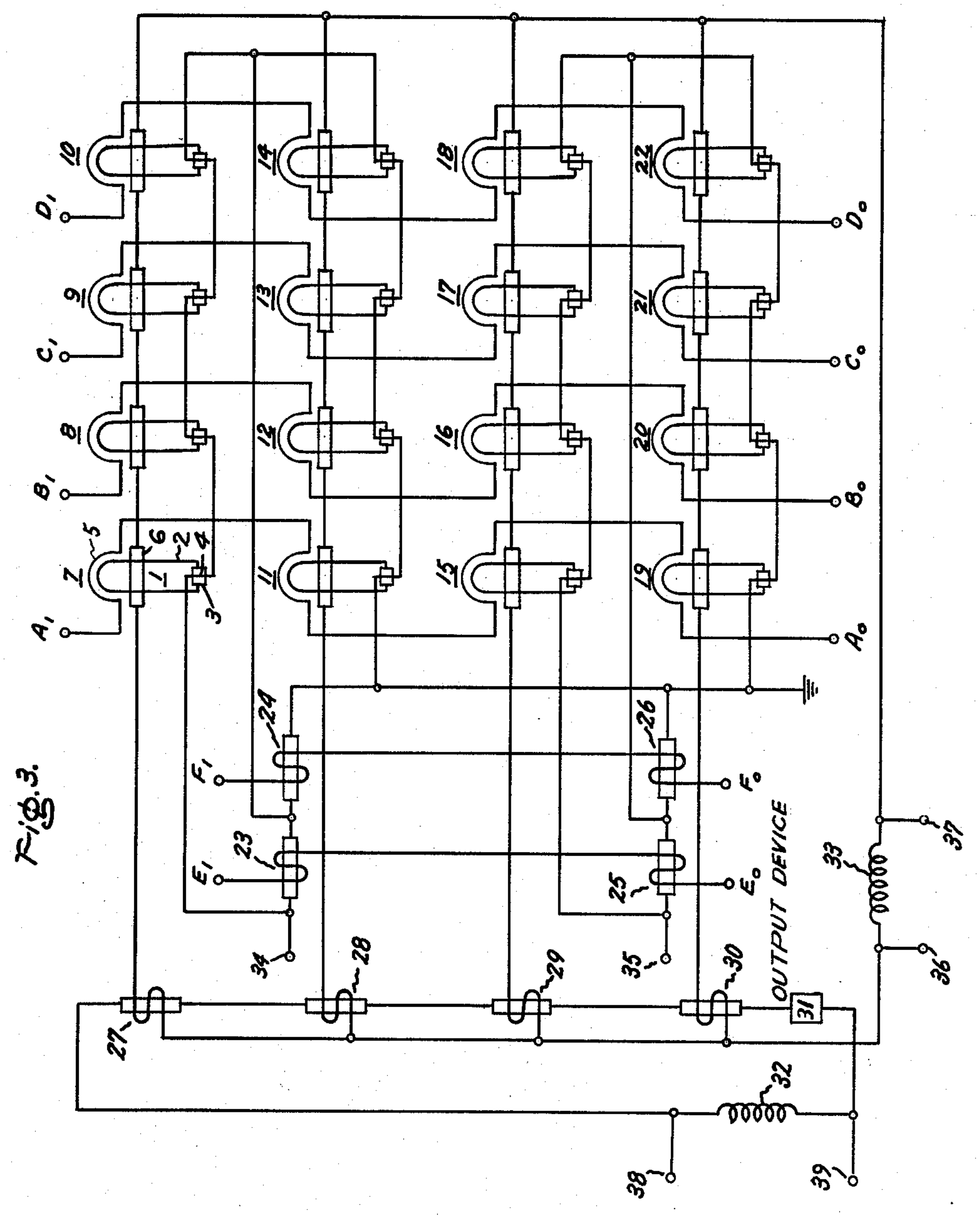
Figure 4:
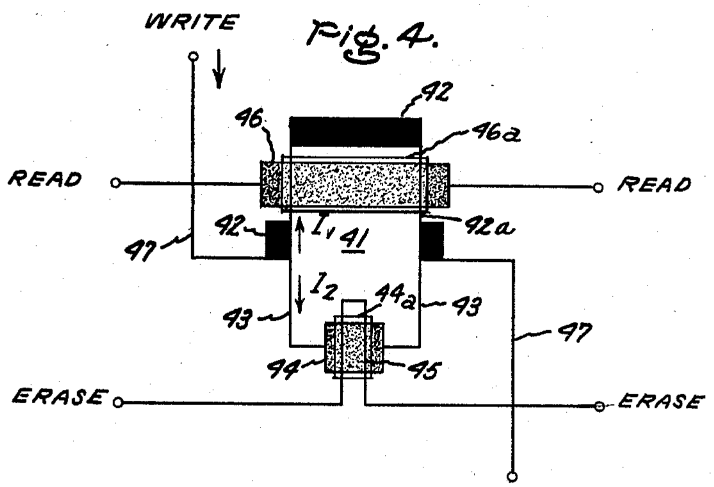
Figure 5:
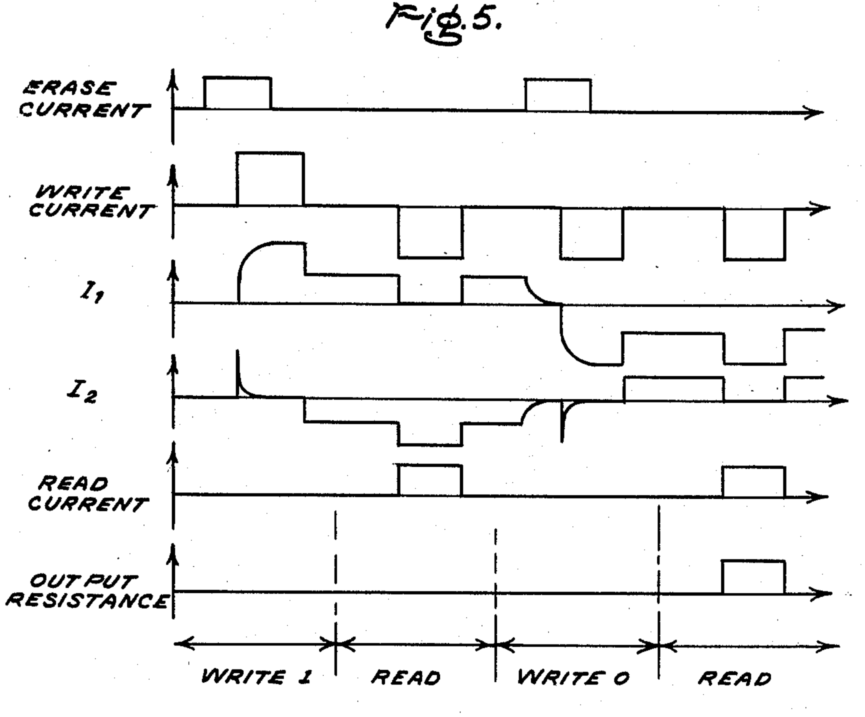

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings in which:

FIG. 1 is a schematic representation of a cryogenic electronic memory cell employed according to the present invention, FIG. 2 is a chart of wave forms illustrating the operation of the FIG. 1 cell, FIG. 3 is a schematic representation of a catalog memory matrix according to the present invention, FIG. 4 is a schematic representation of a modification of the cryogenic electronic memory cell employed according to the present invention, and FIG. 5 is a chart of wave forms illustrating operation of the FIG. 4 device.

Referring to FIG. 1, illustrating the basic unit or cell used in the present invention, a loop of material 1 capable of superconduction is serially formed from a conductor 2 of lead and a tin conductor 3 having a wider transverse dimension. The conductors forming this loop are preferably thin films of the type disclosed in our aforementioned Patent No. 3,076,102, and are deposited on a common insulating substrate in the manner therein set forth. A narrow "erase" grid 4 (formed of lead) overlays tin gate 3 but is insulated electrically therefrom by insulation 4*a* as also taught in the above patent. A half loop 5 or "write" loop is placed over and insulated from conductor 2, so that it is inductively related to the loop including conductor 2 to obtain transformer action between half loop 5 and conductor 2. The top portion of conductor 2 overlays a tin "read" gate 6, being separated therefrom by insulation 6*a*, and acts as a control grid similar to grid 4 with respect thereto.

The cryogenic electronic cell of FIG. 1 is maintained, by means not illustrated, at a very low temperature, which, for presently known superconducting materials, is in the range of liquid helium or liquid hydrogen temperatures. This device may be submerged in liquid helium contained in a Dewar vessel that is surrounded by liquid nitrogen contained in a larger Dewar vessel. This low temperature apparatus is called a cryostat.

The respective grids and gates of the FIG. 1 device are constructed of different materials so that the critical or normalizing field strength for gate conductors is less than for associated grid conductors. At 3.5° K., a typical cryostat temperature, the transition fields for tin and lead are approximately 30 oersteds and 600 oersteds, respectively, attaining the desired differential in transition from the superconducting to the resistive state for these materials. It is understood that other materials having a similar differential in field criticality may be employed, or other means may be employed to insure the respective grids are capable of normalizing the gates over which they lie without themselves becoming resistive.

The operation of the FIG. 1 cell is illustrated by the chart of wave forms shown in FIG. 2. They are, from top to bottom, as a function of time: the erase current in grid 4, the write current in loop 5, the circulating current in loop 1, the read current in tin gate 6, and the output resistance across the latter gate. A "one" stored is indicated by a clockwise current in circulating loop 1, and a "zero" stored is indicated by a counter-clockwise current in the same loop. The respective currents are preferably supplied from constant current generators.

A "one" is written initially when no current is circulating, first, by the application of an erase pulse, followed by a write pulse from the direction shown by the arrow. The write pulse induces a negative current (counter-clockwise) in the circulating loop. The presence of this current and the erase current causes the tin gate 3 to be resistive, dissipating this induced current. When this current is entirely dissipated, the erase pulse is terminated. The write pulse is then terminated and this termination induces a positive current (clockwise) in the circulating loop 1. Since the entire loop is now superconducting, this current will continue to circulate with no decrease in amplitude and a "one" is stored.

The read cycle is initiated by simultaneous application of a negative write pulse and a read current pulse. The negative write pulse induces a positive pulse clockwise in loop 1 which adds to the current already present there. This makes the circulating current substantially double its previous value, and the currents are chosen such that this double current alone through its attendant field is sufficient to drive gate 6 into the resistive region. When the pulses are terminated the circulating current is reduced to its former value, leaving a "one" stored (and allowing tin gate 6 to return to a superconducting state).

To write a "zero" an erase pulse is applied and then a negative write pulse is applied. This induces a positive current in the circulating loop 1 but this quickly dissipates as the gate 3 is resistive. The write pulse is then terminated which induces a negative current in the circulating loop 1, and since the gate 3 is now superconducting, this current will continue to circulate indefinitely. A "zero" is now stored.

When a read cycle is now initiated, by applying a negative write pulse simultaneously with a read current pulse, a positive current is induced in the circulating loop 1. Since this induced current is approximately equal to but opposite to the circulating current already present due to the storage of the "zero," a net current of approximately zero now flows in the circulating loop 1. When the read pulse is applied, substantially no voltage appears across the tin gate 6 indicating no resistance therein. When the negative write pulse is terminated, the circulating current returns to its negative value due to induction between the two loops, leaving a stored "zero." In FIG. 2, the operation of write "one" is again shown, with a stored "zero" as the initial condition.

It is seen that a write cycle consists of an erase pulse followed by a write pulse—positive for storage of a "one" and negative for a storage of a "zero." The read cycle consists of a simultaneous read current pulse and a negative write current pulse. A large output resistance denotes a "one" stored, and a small resistance a "zero."

An alternative read cycle consists of the simultaneous application of a read current pulse and a positive write current pulse. This reduces the circulating current when a "one" is stored to nearly zero amplitude and increases the circulating current amplitude when a "zero" is stored to a large negative value. Since the polarity of the grid current across a gate is unimportant, a large output resistance will now occur in gate 6 when a "zero" is stored and a small resistance when a "one" is stored.

This cryogenic electronic cell operates in accordance with the invention both as a storage element and as an "and" gate for testing coincidence between a bit stored in the loop 1 and a subsequent interrogating write current pulse which may be applied simultaneously with the read current pulse during the read cycle. When the interrogation on the write wire coincides with the stored information (for example, if a "one" is stored and the interrogate gate pulse on the write line is positive) a small or no output resistance will be produced. If the sense of the interrogation pulse does not agree with the stored information, a large output resistance results. A utilization or indicating device for measuring the resistance of the output gate 6 is serially included in the read current lead to gate 6 with the source of read current pulses (not shown). As previously indicated, the device of FIG. 1 is disclosed and claimed in our copending application Serial No. 311,272, filed August 19, 1963, and assigned to the assignee of the present invention.

FIG. 3 illustrates a memory system according to the present invention which may be described as a catalog memory. A catalog memory has important advantages in certain applications over conventional memory arrangements. In computer memories, the information is usually stored as binary digits, arranged in groups called words. In conventional memories, the stored information is located by searching the memory bit by bit, or word by word. In a catalog memory, an interrogate word is selected, fed into the memory system, and may be compared at once with every word in the memory. If any word in the memory corresponds exactly to the interrogate word, an output signal is given. This type of operation can be used, for example, in checking an order stock number against an inventory. If a conventional memory were to be used to this end, each stored word or bit would have to be interrogated separately by location and the desired comparison would have to be made with additional logic circuitry.

The nature of operation of the catalog memory demands that each bit of information stored have associated with it a comparison circuit or "and" gate. The added cost of such a complexity has limited the use of catalog type memories employing vacuum tubes, transistors, magnetic devices, or even conventional cryogenic devices. The memory system according to the present invention employs the information storage and logic functions of arrayed cryogenic electronic storage cells in advantageous combination. In FIG. 3, a 4 x 4 superconductive catalog memory is illustrated (4 words of 4 bits each), together with switching means for writing in and reading out information. Of course, this size array is shown for purposes of illustrative convenience, and not to indicate a limit in the size of such arrays.

Cryogenic electronic memory cells 7 through 22, are arranged in columns and rows with cells 7 through 10 forming the top row and cells 7, 11, 15 and 19 forming the left-hand column. Second, third and fourth rows are placed under one another and are composed of units 11 through 14, 15 through 18, and 19 through 22, respectively. The entire memory apparatus is enclosed in an appropriate refrigeration device.

Units 7 through 10 have their output gates 6 serially interconnected and their erase grids 4 also serially interconnected. The same connections are made in rows 11 through 14, 15 through 18, and 19 through 22, respectively. The cell devices in a given column have their input coupling means 5 serially connected between respective terminals $A_1$–$A_0$, $B_1$–$B_0$, $C_1$–$C_0$ and $D_1$–$D_0$, designating the four digital positions, A, B, C and D, of the stored and interrogated words.

A four position matrix composed of conventional cryogenic switches 23, 24, 25 and 26 is employed for selecting the row of the memory into which a word, A–B–C–D, is read. In this matrix the gate of switch 23 is connected in parallel across the buss serially joining the erase grids 4 of the top row of cryogenic electronic cells, that is cells 7 through 10 and the gates of switches 24, 25 and 26 are similarly arranged in parallel with succeeding rows of erase grids in the memory. The gates of cryogenic switches 23 and 24 are connected in series from terminal 34 to ground, the gates of devices 25 and 26 being similarly connected from terminal 35 to ground. The grids of devices 23 and 25 are serially interposed between terminals $E_1$ and $E_0$, while the grids of devices 24 and 26 are interposed between terminals $F_1$ and $F_0$. Currents used to operate these switches are selected in each instance so that a combination of grid current and gate current is required to return each superconducting gate to its normal or resistive state, whereby a selection of inputs may be employed to place resistance across the erase grids 3 in one row of the memory matrix as hereinafter described.

Each of the serial circuits including the output gates 6 in a row of cryogenic memory devices also serially includes a grid of one of the cryogenic switches 27, 28 and 29 or 30 and then each such combination is paralleled with a superconducting dummy parallel inductance 33 having terminals 36 and 37 connected thereacross. The gates of cryogenic switches 27 through 30 form another series circuit with an output device 31, a superconducting dummy inductance 32 having terminals 38 and 39 being paralleled with the latter serial connection.

All interconnections employed within the memory are preferably superconducting at its operating temperature.

The operation of the FIG. 3 catalog memory matrix system is considered as follows: A current pulse is applied between either terminal 34 or 35 and ground and simultaneouly therewith a current pulse is applied between $E_1$ and $E_0$ or $F_1$ and $F_0$. Assume, for example, that the latter is true in both cases. Then the unit 26 will become resistive and units 23, 24 and 25 will remain superconductive. The large resistance of unit 26 will allow for the current applied at 35 to pass through the erase lines of cells 22, 21, 20 and 19 before the current returns to ground. None of the other long erase lines will conduct much current inasmuch as these lines will be shunted in each case by the superconducting element of much lower inductance.

As a row is thus "selected" with matrix 23–26, the word of information to be stored in this row (units 19 through 22) is presented on write lines, A, B, C and D. If the "A" bit or digit of the word to be stored is a "one," a positive current pulse is applied on line A1–A0 and so on. If a "zero" is to be stored, a negative pulse is inserted on a similar line. Referring to cryogenic electronic storage device 19, for example, the start of the "A" pulse will have no effect upon the storage loop 1 of the unit because of the simultaneous presence of an erase pulse in the same unit as hereinbefore described. However, the erase pulse is arranged to terminate before the end of the "A" pulse by discontinuing the inputs to the matrix 23–26 before the end of the "A" pulse. The conclusion of the "A" pulse induces a "one" in the storage loop of the device, consisting of a clockwise current which will continue to circulate after the "A" pulse is terminated, thereby storing the information. This "A" pulse will not have been stored in the loops of units 7, 11 or 15 inasmuch as no erase pulse was presented to these units and therefore the rise and fall of the "A" pulse had reverse effects on these units.

In the above manner an entire word may be written simultaneously in cryogenic electronic memory devices 19 through 22, the remaining bits thereof being inserted on the B, C and D lines. Other words are written similarly in the other rows. If desired, each of these units can be driven by individual erase lines, allowing individual bits to be written separately in the units.

The read lines of the matrix, that is the serial connections joining the read gates of each row, have been arranged in a parallel circuit having a total of five parallel branches, one of the branches being a dummy inductance 33. Now to interrogate the catalog memory, current pulses representing the bits of an interrogation word are presented at lines A1–A0, B1–B0, etc., and a read current pulse is presented between terminals 36 and 37. In any given storage unit, if the interrogation pulse is of the same polarity as the input bit pulse which caused the circulating current, the read gate 6 of that unit will remain at low resistance. If the interrogation pulse is of the opposite polarity, a large resistance appears at the read gate terminals. Thus, the parallel branch including the gates of a particular row for which complete agreement exists between the bits stored and the interrogation word will have a low resistance and the rest will have a high resistance, providing there is no other agreement. The bulk of the read current from terminals 36 and 37 will pass through that branch where there is agreement and also through the grid wire on one of the units 27 through 30. If, on the other hand, none of the stored words coincided with the interrogation word, the read current would then flow through the superconducting dummy inductance 33, rather than through any of the aforementioned grids. If a stored word coincided with the interrogation word, current will pass through one of the grid wires on units 27 through 30, which will cause one of these units to become resistive making the current from terminals 38 and 39 go through the inductance 32. Little current will then pass through the output device 31, thereby indicating agreement.

It should be noted that in the absence of any interrogation signal, on one of the A, B, C or D terminals, the output gate on corresponding cryogenic electronic memory cells remains non-resistive, since both a circulating current and an opposite interrogating current are required to make the output gate of a particular device go resistive. This provision is useful for interrogation of the memory with shortened words or parts of words. Thus if the catalog memory is interrogated with the shortened word "1—1," the lack of additional bits in the interrogation will not prevent an indication of coincidence. To state it another way, only a positive disagreement will cause output device 31 to be energized.

A refinement of the memory system can be accomplished by breaking up the catalog memory into blocks of words, each block with its own output gating arrangement for representing and indicating the particular location of the coinciding word in the memory.

Another refinement of the catalog memory system can be accomplished by observing in an analog fashion the resistance across the series string of read gates for a particular word—the lower the resistance, the more exact being the agreement with the interrogation word.

Although clockwise and counterclockwise currents are employed in the memory systems described it is understood that other codings may be arranged.

A second cryogenic electronic loop for use in the memory according to the present invention is illustrated in FIG. 4 which may, for example, be employed instead of the FIG. 1 device in the catalog matrix of FIG. 3. This memory loop or cell is also set forth and claimed in our aforementioned application Serial No. 311,272. In this cell the input coupling to the storage loop is direct rather than inductive, allowing simplification of construction. Referring to the figure, a loop of superconducting material 41 includes conductors 42 and 43 formed of lead and a tin gate 44, all connected in series, the loop preferably being formed of deposited film conductors upon an insulating substrate. A lead "erase" grid superconductor 45 crosses gate 44, and is preferably deposited across gate 44 while being insulated therefrom by means of a suitable insulating layer 44*a*. An insulated "read" gate 46 underlies portions of conductor 42 so that conductor 42 forms a grid thereover, insulated therefrom with insulation 46*a*, and input coupling or "write" leads 47 intersect the loop circuit between lead conductors 42 and 43. A superconducting shield plane layer may be formed above or below the device while insulated therefrom in order to increase operating speed.

The unit is operated at temperatures in the superconducting region for the tin and lead conductors employed, by means of suitable refrigeration apparatus. It is again understood that other superconductors could be used instead of tin and lead, so long as the grid conductors in each case are capable of rendering the underlying gate resistive or normal without at the same time adversely affecting their own superconductivity.

Read, write and erase current pulses are applied to the various connections of cryogenic electronic storage cell and these currents are preferably derived from constant current generators. While a conventional voltage source may be employed to energize a superconducting circuit, a resistance must then be inserted between the source and the superconductor for dropping the source voltage, inasmuch as the superconductor in its superconducting state drops no voltage; but, even such a conventional source in series with a resistance may be thought of as a constant current source relative to the superconductor because the superconducting portion of the combined circuit does not determine the current flow.

In the FIG. 4 cell if both branches were kept superconducting, and a write current were applied through leads 47, it is found that this current will initially divide through the two branches in inverse proportion to their respective inductances. This current ratio will continue even in the steady state or D.C. case after the initial current increase, because there is then no force present to change the current distribution, the voltage drop across both superconductors being zero. If the current supply is then removed, a reaction voltage appears across each of the two branches caused respectively by the collapse of the larger current in the smaller inductance and the smaller current in the larger inductance. The voltages across the two branches are equal and opposite with respect to one another and no loop current will flow.

If one branch is made initially resistive the entire current from the source will flow in the other branch and the first branch will have no initial current flowing therein. The first branch will then develop no reaction voltage at the conclusion of the current pulse and the reaction voltage across the other branch will be capable of forcing reverse current flow in the first branch, thus causing a persistent current to flow around the loop. It should be noted then, that in order to establish a persistent current in the loop, one branch thereof may be made resistive during introduction of current into the other branch, and then the first branch is allowed to become superconducting again before the outside source of current is disconnected. Upon termination of the outside current, a persistent loop current is established.

In the present loop device, input coupling leads 47 intercept the loop between conductors 42 and 43, and are positioned to thereby divide the loop into two branches having nearly equal inductance. To this end, portions of deposited conductor 42 are widened, with the exception of the grid portion 42*a* overlying the gate 46, for equalling the inductance of the branch comprising conductor 43 and relatively wide gate 44. Since the two branches then have equalized inductance, a current pulse applied through leads 47 will divide equally between the two branches, providing both are superconducting.

The actual operation of the FIG. 4 device is illustrated in the FIG. 5 chart of waveforms. The waveforms are from top to bottom, as functions of time: the erase current in the grid 45, the write current in input coupling leads 47, the current $I_1$ in conductors 42, across the thin film gate 46, the current $I_2$ in conductors 43 and thin film gate 44, the read current applied through gate 46, and the output resistance measured as a voltage across gate 46 in the presence of the read current. A "one" is indicated by a clockwise current in loop 41 (in the direction of $I_1$) and a "zero" is indicated by a counterclockwise current. A "one" is written initially when no current is circulating first by the application of an erase pulse followed by a positive write pulse in the direction shown by the arrow on the diagram. Inasmuch as the erase pulse renders the gate 44 resistive, the entire write current initially flows as $I_2$ through the conductor 42 thereby rendering gate 46 resistive. $I_2$ becomes zero since the superconductor 42 represents a substantial short circuit across the conductor 43 and furthermore the current $I_2$ remains zero at the conclusion of the erase pulse since essentially no voltage drop then exists along the conductor 42 to initiate a current $I_2$.

When the write pulse concludes, however, supercurrent $I_1$ will continue to flow and will follow a path through conductors 43 and gate 44 in a direction negative to $I_2$. $I_1$ drops to half due to the additional inductance initially encountered in the equal inductance branch including conductors 43 and gate 44. This persistent current, indicative of a stored "one," will continue to flow indefinitely until some outside influence, such as an erase current across grid 45, forces its conclusion.

The read cycle is initiated by the simultaneous application of a negative write pulse and a read current pulse. This write current pulse carried by leads 47 divides between conductors 42 and 43 in inverse proportion to the respective inductances of these branches, i.e., equally. The negative write current and its field subtracts from the circulating current in conductor 42 and its magnetic field, substantially zero $I_1$ current remaining therein. Therefore introduction of the read current drops zero voltage across gate 46 indicating its continued zero resistance condition.

The introduction of the next erase pulse renders gate 44 resistive and therefore terminates the persistent current in the loop 41. A zero is written in the loop 41 by first applying a negative write pulse to leads 47 before termination of the erase pulse. The entire write pulse eventually flows in conductors 42 inasmuch as a gate 44 is rendered resistive because of the continuing erase pulse in grid 45. At the conclusion of the erase pulse the entire negative write pulse will continue to flow in conductor 42 since no voltage drop then exists along conductor 42 which would cause a current to flow in conductor 43 and gate 44. However, at the conclusion of the negative write pulse, this negative $I_1$ current will persist and flow through conductors 43 and gate 44 in the direction shown by the $I_2$ arrow. This current will be half the previous value for $I_1$ because of the additional equal inductance encountered in the branch formed by conductors 43 and gate 44. Now, application of a negative write pulse will divide equally between the two superconductive branches, therefore adding to the negative $I_1$ flowing in conductor 42. This combined current or combined field of the currents is sufficient for rendering gate 46 resistive when a read current pulse is applied to gate 46 and therefore the read current pulse will drop a voltage across gate 46 indicative of resistance therein and therefore indicative of a stored zero.

It is noted that for the current directions given in FIG. 4, the resistance and non-resistance conditions of the read gate are interchanged from those of the FIG. 1 cell, so that agreement of write and interrogate pulses will cause resistance to exist in the read gate while disagreement will cause no resistance to exist in the read gate. Therefore the FIG. 3 matrix employing FIG. 4 cells will be responsive to coincidence with an interrogation which is the complete negative or complement of a stored signal. This apparent difficulty may be alleviated by interrogating with a negative or complement of the word sought in the memory. Alternatively, the read gates of a row in the memory may be arranged in a parallel read out matrix, arranged to give a coincidence indication only when all are resistive by diverting current into a dummy inductance cooperating with each such row. A superconductive "or" gate could then determine whether current was flowing through such a dummy inductance, for example, an "or" gate of the type comprising switches 27, 28, 29 and 30 in FIG. 3.

Extremely compact memory organizations employing apparatus in accordance with the present invention may be advantageously substituted for magnetic drum, magnetic core or tape, transistor, or other conventional systems. The cryogenic electronic memory of the present invention may be vacuum deposited in the form of a large array including switching and storage elements together with interconnections. The memory is therefore cheaper and much more simply fabricated than existing conventional semiconductor or magnetic devices.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desired to secure by Letters Patent of the United States is:

1. A catalog memory matrix composed of memory devices each having a superconductive loop, a superconductive gate influenced by said loop, coupling means associated with said loop for causing conduction in a selected direction over at least a portion of said loop, inhibiting means for destroying superconduction over at least a portion of said loop to establish a persistent current in said loop, said catalog matrix comprising a first bank of leads interconnecting the coupling means of the memory devices in separate columns each representative of a digit position for inserting information into said memory devices and selectively comparing an interrogation therewith, a second bank of leads separately connecting the inhibiting means of said same memory devices in rows perpendicular to said columns for selectively inhibiting the devices of one of said rows to address the devices thereof, and the third bank of leads connecting the superconductive gates of said memory devices in the same rows as said second bank, and means for introducing current to said last mentioned bank concurrent with an interrogation and for measuring the current in said rows thereof to give an indication of agreement of the interrogation with a given stored row.

2. The device set forth in claim 1 wherein said loop, said inhibiting means, said gate and said coupling means comprise superposed deposited layers on a common substrate with insulating means between said layers.

3. A catalog memory array comprising elements each having a persistent current loop, measurement gate means thereacross and means for coupling a current thereto, inhibiting grid means across said loop for cooperating to establish a persistent current in said loop by rendering a portion of said loop resistive, said array having the coupling means of said devices serially connected in a plurality of columns so that signals representative of various words to be stored and compared may be coupled thereto, said array also having their inhibiting grid means and measurement gate means each serially connected in rows, means for selectively energizing rows of said inhibiting grid means, and means for measuring the resistance of said rows of measurement gate means.

4. The device as set forth in claim 3 wherein said loop, said inhibiting grid means, said measurement gate means and said coupling means comprise superposed deposited layers on a common substrate with insulating means between said layers.

5. A superconductive catalog memory matrix comprising: a first row of terminals for presenting words of information to be stored and compared; a plurality of memory devices arranged in columns and rows and each having a superconductive loop for storing only one persistent current per bit of information, means for entering a current into said loop, current measuring means, and inhibiting means for cooperating to establish a persistent current in said loop by rendering a portion of said loop resistive; circuitry coupling said current entering means of a given column to one of said terminals; circuitry interconnecting said inhibiting means in a given row and for selectively energizing the same; and means interconnecting said measurement means in a given row and for detecting which row obtains the lowest resistance upon presentation of an interrogation to said terminals.

6. The device as set forth in claim 5 wherein said loop, said current entering means, said measuring means and said inhibiting means comprise superposed deposited layers on a common substrate with insulating means between said layers.

7. A plurality of memory devices arranged in an array of columns and rows, each comprising a superconductive loop, inhibiting means crossing said loop, superconductive gate means crossing said loop, means for coupling a current into said loop, said array having the coupling means of said devices connected in a plurality of columns for coupling to signals representative of various words to be stored and compared, said array having said inhibiting means and gate means connected in separate rows, means for coupling an inhibiting pulse to selected inhibiting means in a row, means for presenting information of a first polarity to said coupling means concluding after presentation of an inhibiting pulse to said selected inhibiting means, means for coupling an interrogation signal to said coupling means, and means for sending a current through said gate means at the same time as said interrogation signal to ascertain the polarity agreement of said interrogation signal with respect to said first polarity.

8. The device as set forth in claim 7 wherein said loop, said inhibiting means, said gate means and said current coupling means and said sensing means comprise superposed deposited layers on a common substrate with insulating means between said layers.

9. A catalog memory array comprising a plurality of cryogenic persistent current memory loops capable of carrying a persistent current, each including coupling means for inserting a current into the loop, each also having associated therewith second means in cryotron grid relation to said loop for quenching a current in a portion of said loop to establish persistent current in said loop upon the conclusion of said current inserted into said loop and each loop having a third cryotron gate means for detecting a current in each said loop, said array having only one persistent current loop per bit of information stored and having the said first coupling means of said devices serially connected in a plurality of columns, connection means for presenting currents to said columns representative of information for storage in said array and later for presenting second currents representative of information for interrogation of said catalog memory array, which second currents add to persistent currents stored in said array to change the resistance of said third means, said array also having the second means of said loops interconnected in a plurality of separate groups representative of words of information stored for addressing the said groups, and said array having said third means of said loops interconnected in a plurality of similar separate groups, means for introducing a current into groups of said third means concurrent with interogation current applied to said connection means, and means for measuring the current flowing in said last mentioned groups to give an indication of agreement of the interrogation with information stored in a particular group corresponding to a word of information.

10. A catalog memory array comprising a plurality of cryogenic memory loops capable of carrying a persistent current, each including coupling means for inserting a current into the loop, each also having associated therewith second means for quenching a current in a portion of said loop whereby persistent current is established in said loop upon the conclusion of current inserted into said loop and each having a third means for detecting a current in each said loop, said array having the coupling means of said devices serially connected in a plurality of columns, connection means for presenting currents to said columns representative of information to be stored in said array and at a later time representative of information with which said catalog memory array is interrogated, said array also having said second means of said loops interconnected in a plurality of separate blocks representative of words of information stored for the purpose of addressing said blocks, and said array having said third means of said loops interconnected in a plurality of similar separate blocks, means for introducing a current into blocks of said third means concurrent with an interrogation current applied to said connection means, and means for measuring the current in said last mentioned blocks to give an indication of agreement of the interrogation with information stored in a block corresponding to a word of information, each block indicating the particular location of information in the memory which compares with the interrogation presented.

11. A catalog memory array comprising a plurality of cryogenic memory loops capable of carrying a persistent current, each including coupling means for inserting a current into the loop, each also having associated therewith second means for quenching a current in a portion of said loop whereby persistent current is established in said loop upon the conclusion of current inserted into said loop and each having a third means for detecting a current in each said loop, a substrate, said third means being deposited upon said substrate, said loop being deposited with a portion thereof extended across said third means and having insulation intervening therebetween, said second means being deposited across a portion of said loop and having second insulation means intervening between said second means and said loop, said coupling means comprising a pair of conductors one of which is connected to each side of said loop between said second means and said third means, said array having the coupling means of said devices serially connected in a plurality of columns, connection means for presenting currents to said columns representative of information to be stored in said array and at a later time representative of information with which said catalog memory array is interrogated, said array also having said second means of said loops interconnected in a plurality of separate groups representative of words of information stored for the purpose of addressing said groups, and said array having said third means of said loops interconnected in a plurality of similar separate groups, means for introducing a current into groups of said third means, concurrent with an interrogation current applied to said connection means and means for measuring the current in said last mentioned groups to give an indication of agreement of the interrogation with information stored in a particular group corresponding to a word of information.

12. A catalog memory array comprising a plurality of cryogenic memory loops capable of carrying a persistent current, each including first coupling means for inserting a current into the loop, each also having associated therewith second means for quenching a current in a portion of said loop whereby presistent current is established in said loop upon the conclusion of current inserted into said loop and each having a third means for detecting a current in each said loop, a substrate, said third means being deposited upon said substrate, said loop being deposited with a portion thereof extended across said third means having insulation intervening therebetween, said second means being deposited across a portion of said loop having second insulation means intervening between said second means and said loop, said coupling means comprising a coupling loop inductively coupled to said first mentioned loop, said array having the coupling means of said devices serially connected in a plurality of columns, connection means for presenting currents to said columns representative of information to be stored in said array and at a later time representative of information with which said catalog memory array is interrogated, said array also having said second means of said loops interconnected in a plurality of separate distinct groups representative of words of information stored for the purpose of addressing said groups, and said array having said third means of said loops interconnected in a plurality of similar separate groups, means for introducing a current into groups of said third means concurrent with an interrogation current applied to said connection means and means for measuring the current in said last mentioned groups to give an indication of agreement of the interrogation with information stored in a particular group corresponding to a word of information.

13. A catalog memory array comprising a plurality of cryogenic persistent current memory loops capable of carrying a persistent current, each including coupling means for inserting a current into the loop, each also having associated therewith second means in cryotron grid relation to said loop for quenching a current in a portion of said loop to establish persistent current in said loop upon the conclusion of said current inserted into said loop and each loop having a third cryotron gate means for detecting the magnetic field of the current in each said loop, said array having the said first coupling means of said devices coupled in a plurality of columns, connection means for presenting currents to said columns for storage in said array, said array also having the second means of said loops interconnected in a plurality of distinct groups representative of words of information stored for addressing the said groups, and said array having said third means of said loops interconnected in a plurality of similar distinct groups also representative of words of information, wherein the loops of said memory array are interrogated for their information by producing a magnetic field coincident with selected third means, said field being indicative of said interrogation, and means for introducing current into groups of said third means so that current flow in a group of said third means indicates the agreement status of that group with an interrogation.

14. A catalog memory array comprising a plurality of cryogenic memory cells capable of carrying a persistent current, each including coupling means for inserting a current into the cell, each also having associated therewih second means for quenching a current in said cell and each having a third means for detecting the magnetic field of the current in each said cell, said array having the coupling means of said devices coupled in a plurality of groups, and connection means for presenting currents to said groups, said array having said second means of said cells separately interconnected in a plurality of distinct blocks representative of words of information stored for the purpose of addressing said words, and said array having said third means of said cells separately interconnected in a plurality of similar distinct blocks also representative of words of information wherein the cells of said memory array are interrogated for their information by producing a magnetic field coincident with selected third means which field is indicative of said interrogation, and means for measuring current flow in said last mentioned blocks for indicating when a block is in agreement with an interrogation.

15. A catalog memory array comprising a plurality of cryogenic memory loops capable of carrying a persistent current, each including coupling means for inserting a current into the cell, each also having associated therewith second means for quenching a current in a portion of said loop whereby persistent current is established in said loop upon the conclusion of current inserted into said loop and each having a third means for detecting the magnetic field of the current in each said loop, a substrate, said loop being deposited with a portion thereof extended in insulated juxtaposition with said third means, and with a portion of said loop in insulated juxtaposition with said second means, said coupling means comprising a pair of conductors one of which is connected to each side of said loop, said array having the coupling means of said devices coupled in a plurality of columns, connection means for presenting currents to said columns representative of information to be stored in said array, said array also having said second means of said loops interconnected in a plurality of separate groups representative of words of information stored for the purpose of addressing said groups, and said array having said third means of said loops interconnected in a plurality of similarly separate groups also representative of words of information, wherein the loops of said memory array are interrogated by producing a magnetic field indicative of said interrogation, said field being coincident with selected third means, and means for introducing a current into groups of said third means, the current status in a group of third means indicating agreement of that group with an interrogation.

16. A memory system for parallel comparison of digits of an interrogation word with digits of plural stored data words arranged in corresponding digit order comprising: a matrix including rows of storage cells wherein each row stores a data word, each of said cells including conduction means for establishing and circulating persistent current representative of a stored digit, said persistent current setting up a magnetic field in a given direction at said cell, detection means coupled in distinct rows corresponding to said data words, said detection means being responsive to said magnetic field at said cells, and means for simultaneously interrogating a plurality of said cells at corresponding digit order locations in plural rows of said matrix including means for establishing a magnetic field at selected cells of corresponding digit order location in said plural rows of said matrix, which field is coincident with at least a portion of said first magnetic field for establishing a resultant field at said detection means indicating the relative sense of said stored data and said interrogation at said detection means through selective reinforcement and subtraction of said fields.

17. A memory system for parallel comparison of digits of an interrogation word with digits of plural stored data words arranged in corresponding digit order comprising: a matrix including rows of storage cells wherein each row stores a data word, each of said cells including conduction means for establishing and circulating persistent current representative of a stored digit, said persistent current setting up a magnetic field in a given direction at said cell, detection means coupled in distinct rows corresponding to said data words, said detection means being responsive to said magnetic field at said cells, and means for simultaneously interrogating a plurality of said cells at corresponding digit order locations in plural rows of said matrix including means for establishing a magnetic field at selected cells of corresponding digit order location in said plural rows of said matrix which field is coincident with at least a portion of said first magnetic field for establishing a resultant field at said detection means indicating the relative sense of said stored data and said interrogation at said detection means through selective reinforcement and subtraction of said fields, said detection means in a given distinct row indicating the row responsive to an interrogation.

No references cited.

IRVING L. SRAGOW, *Primary Examiner.*